(12) United States Patent
Doerr et al.

(10) Patent No.: US 12,099,594 B1
(45) Date of Patent: Sep. 24, 2024

(54) SOCKET CONNECTION VERIFICATION

(71) Applicant: HERE ENTERPRISE INC., New York, NY (US)

(72) Inventors: Chuck Doerr, New York, NY (US); Andrew Westacott, East Lothian (GB)

(73) Assignee: Here Enterprise Inc., New York, NY (US)

( * ) Notice: Subject to any disclaimer, the term of this patent is extended or adjusted under 35 U.S.C. 154(b) by 0 days.

(21) Appl. No.: 18/600,220

(22) Filed: Mar. 8, 2024

Related U.S. Application Data

(63) Continuation of application No. 18/408,316, filed on Jan. 9, 2024.

(51) Int. Cl.
*G06F 21/44* (2013.01)

(52) U.S. Cl.
CPC .................................. *G06F 21/44* (2013.01)

(58) Field of Classification Search
CPC ....................................................... G06F 21/44
See application file for complete search history.

(56) References Cited

U.S. PATENT DOCUMENTS

| 8,219,805 | B1* | 7/2012 | Le | H04L 9/3265 |
| | | | | 713/156 |
| 10,135,808 | B1* | 11/2018 | Wasiq | H04L 63/1408 |
| 10,594,673 | B1* | 3/2020 | Larios | G06F 9/546 |
| 10,970,410 | B2* | 4/2021 | Barnes | G06F 21/6218 |
| 11,431,510 | B1* | 8/2022 | Stapleton | H04L 9/3268 |
| 11,907,212 | B1* | 2/2024 | Hamilton | G06F 16/2448 |
| 11,968,302 | B1* | 4/2024 | Kumar | H04L 9/0891 |
| 2010/0125891 | A1* | 5/2010 | Baskaran | G06F 21/6218 |
| | | | | 726/4 |
| 2014/0019746 | A1* | 1/2014 | Hans | H04W 4/80 |
| | | | | 713/150 |
| 2014/0026228 | A1* | 1/2014 | Isozaki | G06F 21/57 |
| | | | | 726/27 |
| 2014/0095874 | A1* | 4/2014 | Desai | H04L 63/0815 |
| | | | | 713/168 |
| 2014/0181527 | A1* | 6/2014 | Scolari | H04L 63/126 |
| | | | | 713/176 |
| 2014/0229525 | A1* | 8/2014 | Crawford | H04L 67/14 |
| | | | | 709/203 |
| 2015/0302215 | A1* | 10/2015 | Hu | G06F 21/62 |
| | | | | 726/30 |
| 2017/0063975 | A1* | 3/2017 | Prakash | G06F 21/73 |
| 2018/0278611 | A1* | 9/2018 | Tan | H04L 9/3268 |
| 2019/0372783 | A1* | 12/2019 | Martinez | H04L 63/10 |
| 2019/0379540 | A1* | 12/2019 | Liderman | G06F 21/606 |
| 2020/0136836 | A1* | 4/2020 | Schiattarella | H04L 63/0823 |

(Continued)

*Primary Examiner* — Darren B Schwartz
(74) *Attorney, Agent, or Firm* — Womble Bond Dickinson (US) LLP

(57) ABSTRACT

Disclosed is a method and apparatus for verifying socket connections. The method includes receiving a socket connection request and determining a process executable that initiated the socket connection request. The method further includes determining, by a processing device, whether verification data associated with the process executable corresponds to expected verification data of the process executable. Finally, the method includes in response to the verification data corresponding to the expected verification data, permitting a socket connection corresponding to the socket connection request.

17 Claims, 6 Drawing Sheets

(56) References Cited

U.S. PATENT DOCUMENTS

| | | | | |
|---|---|---|---|---|
| 2021/0019382 A1* | 1/2021 | Huang | ................... | G06F 21/31 |
| 2021/0374285 A1* | 12/2021 | D'Agostino | ........ | G06F 21/6245 |
| 2022/0004645 A1* | 1/2022 | Agarwwal | .............. | H04L 63/20 |
| 2023/0229752 A1* | 7/2023 | Brooks | .............. | H04L 63/0823 |
| | | | | 726/10 |
| 2023/0239285 A1* | 7/2023 | Brooks | .............. | H04L 63/0823 |
| | | | | 713/156 |

* cited by examiner

SOCKET CONNECTION VERIFICATION

CROSS-REFERENCE TO RELATED APPLICATIONS

This application is a continuation of U.S. Ser. No. 18/408,316 filed on Jan. 9, 2024, the contents of which are hereby incorporated by reference.

TECHNICAL FIELD

This disclosure generally relates to data security. In particular, this disclosure relates to data security for inter-application communication and socket connection data security.

BACKGROUND

Using computer applications that communicate with each other is common practice in modern enterprise computer networks. Inter-application communication occurs between native computer applications on computing devices as well as between native applications and proprietary and other non-native computer applications. To facilitate this inter-application communication, computer applications may send socket connection requests to the application with which they wish to communicate. For example, if a native application on a computer attempts to communicate with a proprietary application operating on the same computer, the native application will send a socket connection request to the proprietary application to establish a communication path with the proprietary application. The socket connection is established and then the native application is able to communicate with the proprietary application to exchange or communicate data.

However, in some cases, the application attempting to establish the socket connection is a nefarious application which was designed to communicate with the other application to steal or otherwise corrupt data. As such, it may be desirable to verify the authenticity of the application sending the socket connection request before accepting such a request or before establishing communication with the application that sent the socket connection request.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

As described above, currently, applications attempting to communicate with each other may establish a socket connection to facilitate the exchange of data between the applications. The socket connection request will be sent from a first application attempting to establish the connection and then received by a second application with which the first application wants to communicate. However, in some cases, it may be desired to verify that the application sending the socket connection request is authentic and trusted (i.e., developed by a known, trusted source) before allowing it to communicate with the second application. Described herein is a method and apparatus for incoming socket connection verification.

The subject matter described herein details an improvement in the functioning of computer technology, namely an improvement to the security of data communication between computer applications. The improvement in data security involves preventing non-approved computer applications from generating a socket connection with another computer application without the non-socket connection generating application first verifying that the application that generated the socket connection is an approved application or otherwise sourced by an authentic software developer. By adding this verification step, the subject matter of the present disclosure automatically prevents a computer application from sharing potentially sensitive data with nefarious actors.

Figure 1:
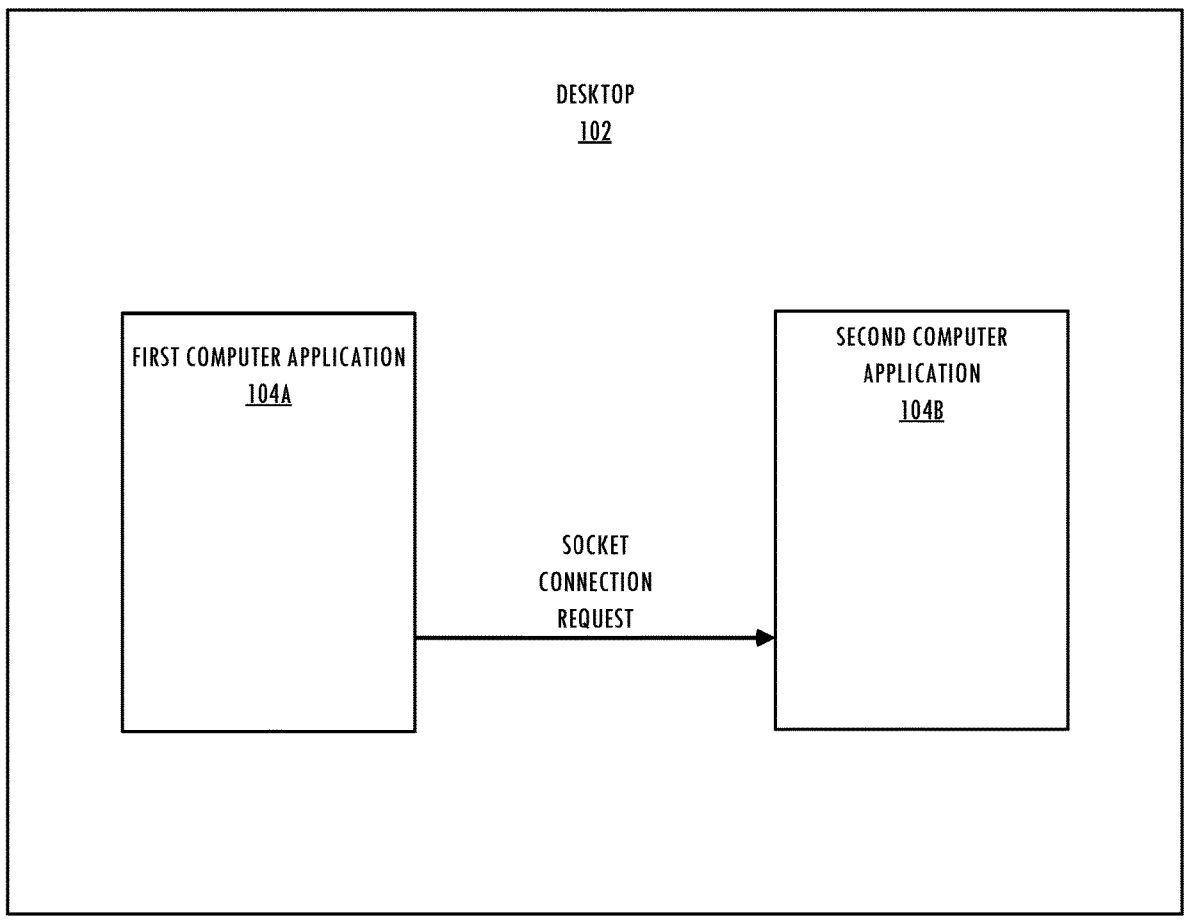
FIG. 1 is a block diagram of an example computing system in accordance with one or more embodiments of this disclosure.

FIG. 1 illustrates a computing environment 100 similar to that described above. The computing environment may include a desktop 102, mobile phone, smart device, computer, or other computing device with at least two computer applications operating thereon. For example, in the computing environment in FIG. 1, the desktop has first computer application 104A and second computer application 104B operating thereon. As described above, in order to communicate with each other, first computer application may send a socket connection request to second computer application. The second computer application will then process the socket connection request and the socket connection will be established.

Figure 2:
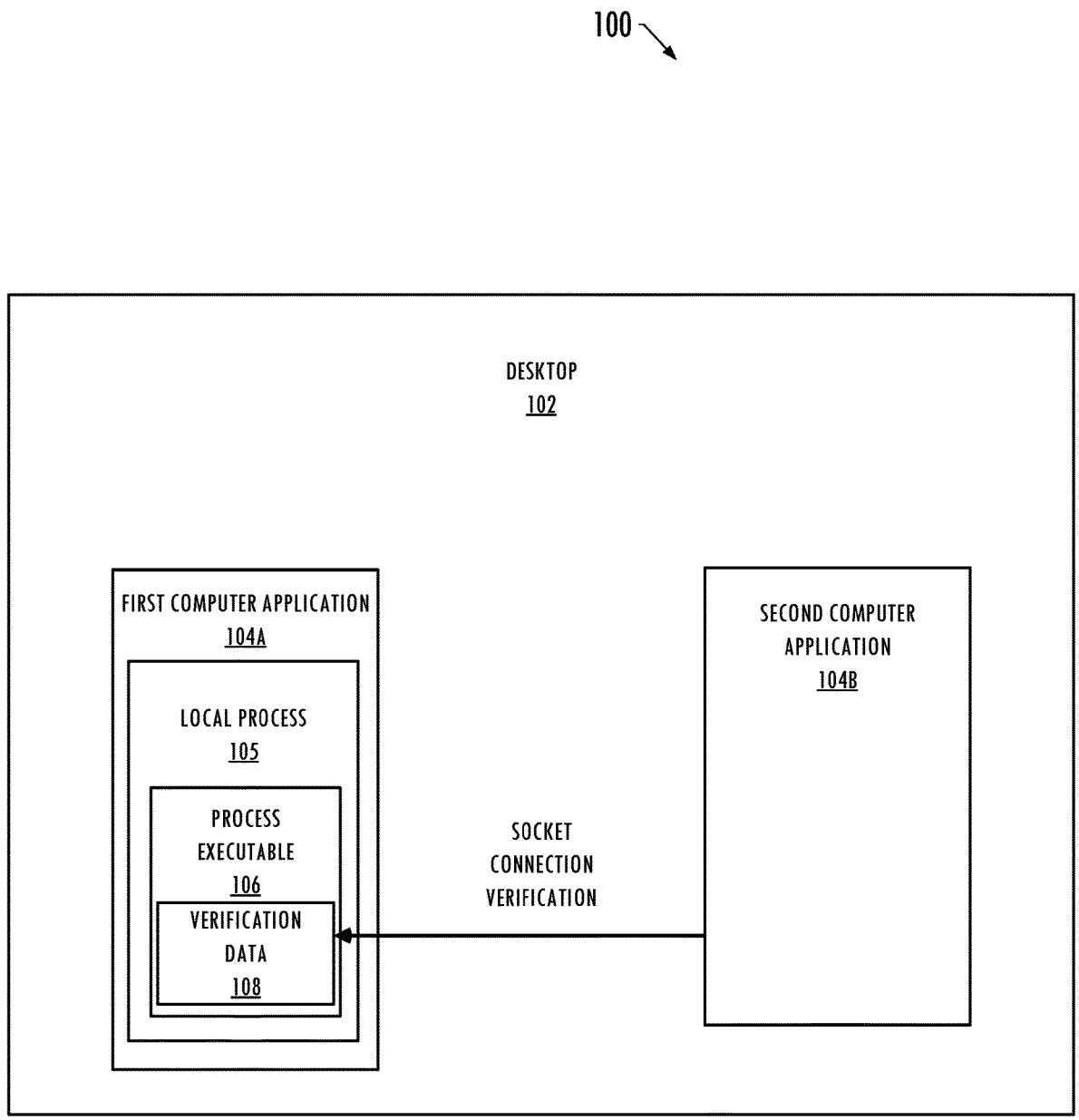
FIG. 2 is a block diagram of the computing system in accordance with one or more embodiments of the disclosure.

FIG. 2 illustrates a similar computing environment 100 as FIG. 1. However, here, instead of allowing the socket connection to be formed with no verification, socket connection verification is performed. As will be discussed herein, the socket connection request can be traced back to the originating local process 105 of the first computer application 104A that initiated the socket connection request. The local process includes at least one process executable 106 that itself generated the socket connection request. The process executable may include verification data 108 that verifies that the local process and therefore the first computer application is an authentic application. For example, the verification data can include signing details such as a software publisher certificate or other signing details. The verification data may also include a code signing certificate or a software singing certificate. These certificates are digital certificates that software publishers use to digitally sign software before releasing it to the public. The certificates verify the authenticity of the application and the processes operating therein.

Other verification data may be used as well. For example, any indicator, sign, or symbol may be used by the software application developer to verify or authenticate that the application that includes the indicator, sign, or symbol is trusted or authentic and not a nefarious application such as a virus, spyware, or other intruder into the computer operating the applications.

Figure 3:
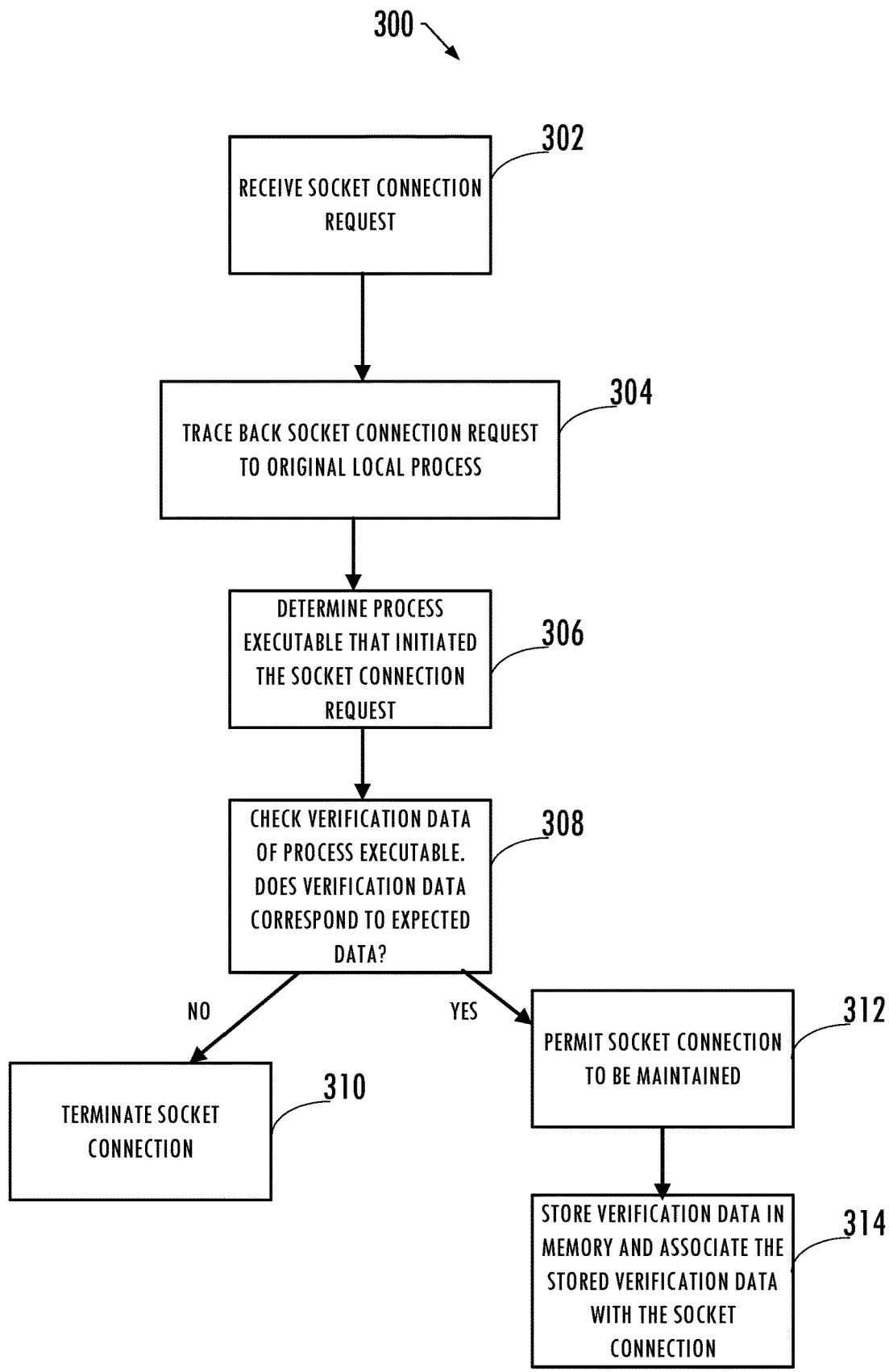
FIG. 3 is a flow chart illustrating various operations of a socket connection verification method in accordance with one or more embodiments of the disclosure.

FIG. 3 is a more detailed flow chart 300 illustrating various operations of the socket connection verification method of the present disclosure. In some embodiments, a user of a computer may wish to operate multiple computer applications at the same time or the computer being utilized may need to operate multiple computer applications at the same time. In some cases, these computer applications may need to communicate with each other (i.e., inter-application communication). In such an embodiment, a first computer application may send a socket connection request and that request is received by the second computer application. Once the second computer application receives the socket connection request 302, the second computer application will verify that the socket connection request is being received from a verified or authentic, or otherwise approved software application author. In some embodiments according to the method of the present disclosure, the computer application receiving the socket connection request will not allow communications over the socket connection to take place without first verifying that the originating local process (i.e., the process that originated the socket connection request) is authentic or valid, based on verification data associated with and extracted from the local process.

To perform the socket connection verification of the method described herein, the processing device executing the second computer application first traces the socket connection request back to the original local process that generated the request 304. In some embodiments, the processing device uses a software development kit (SDK), such as, for example, Microsoft Windows SDK, Android NDK, iOS SDK, Java Development Kit, Java Web Services Development Pack, or other suitable software development kit to trace or retrieve the original process that made the socket connection request. The SDK can include an operating system (OS) level application programming interface (API) that allows the processing device to request from Windows (or other OS operating on the computer system) a list of open ports. The processing device then searches for the matching incoming port on any established sockets. Next, the processing device retrieves the process ID (PID) of the owning process (e.g., Microsoft Excel) for the particular socket in question (i.e., socket connection request). Once the PID is retrieved, the processing device queries Windows for the full executable details for the particular process associated with the PID. In other words, the full file path to the process or source executable (EXE) (e.g., "excel.exe") is retrieved 306. In this example, Microsoft Excel is the process and "excel.exe" is the source or process executable that actually initiated the socket connection request.

Next, the processing device is to query Windows to verify the EXE which informs the processing device whether the EXE has been signed at all 308. If the EXE is not signed, the processing device will optionally reject the socket connection. If the EXE is signed, the processing device is to validate the signature by first querying Windows (or any other suitable OS), such as through the Crypto APIs, or any other suitable source, to retrieve or extract any verification data such as certificates and signing information attached to the EXE. Once retrieved or extracted, the processing device is to perform validation of the signing info as described herein. For example, the processing device is to validate that the signing information corresponds to expected singing information for the particular EXE. If the extracted singing information corresponds to the expected signing information, the processing device is to accept the socket connection 312. Otherwise, if the extracted signing information does not correspond to the expected signing information, the processing device is to deny or reject the socket connection 310. The above operations are all performed by the processing device that is executing the second computer application. Additionally, the operations above are described in relation to the Microsoft operating system, but a similar process can be used with respect to Apple OS, Linux OS, or any other suitable OS.

The process executable is typically signed, using a software certificate, to certify that it is an authentic software application. In other embodiments, the process executable includes a software certificate or other signing details to certify that the process executable is authentic and not some nefarious actor. Those having ordinary skill in the art will appreciate that software applications, including their executables, have known signing details. For example, Microsoft and other software developers sign software they develop using a certificate or other signing details, as discussed above, and these signing details are made public so that users of software can verify the authenticity of software they use. That is, in the example above, Microsoft Excel and the "excel.exe" discussed above will have a software certificate, or other signing details, associated with Microsoft, and the signing details or certificate will verify that the Microsoft Excel and "excel.exe" processes are authentic to Microsoft. Validation or verification of these verification details include validating or verifying that the extracted signing details or certificates of the processes from the socket connection request actually match what the public certificates or other signing details of the processes say they should be. In some cases, users can make a list of known and trusted (or otherwise permitted) software certificates or other signing details associated with known software applications and their process executables. In other instances, computers are programmed with their own list of software certificates and known signing details or the computers may be able to determine the known signing details by accessing them over the Internet.

In any case, in some embodiments, once the software certificate or other signing details are extracted or read from the process executable of the connecting process, the extracted data is compared to expected data within the list of known software certificates. For example, if the process executable is the "excel.exe" process executable discussed above, the extracted signing details will be compared to the known list of software certificates and signing details. If the extracted signing details or verification data does not match a known software certificate or singing details on the list of known signing details and software certificates, then the socket connection request from the first computer application is rejected by the second computer application and the socket connection is terminated 310. In this case, using the example scenario above, the extracted signing details are either not on the list of expected signing details at all or the extracted signing details or certificate does not match the expected signing details or certificate that is expected of Microsoft or Microsoft Excel.

However, if the extracted details correspond to or match expected signing details on the known list of software certificates, the socket connection request is accepted and the socket connection is allowed to be maintained between the first computer application and the second computer application 312. In this scenario for example, the extracted signing details match the signing details or software certificate of Microsoft or Microsoft Excel. The extracted verification data, including the extracted signing details or software certificate is then saved in memory and the saved verification data is associated with the socket connection 314.

In some embodiments, once the identity of the connecting process and its process executable is verified, the method may include security arrangements beyond just blocking or allowing the socket connection to be formed. For example, in some embodiments, the method includes setting communication permissions on the socket connection based on the verified identity of the connecting process via the verification data therein. For example, based on the verification data, including the software certificates and singing details, extracted from the process executable, the method can include allowing certain data to be communicated across the socket connection and blocking other data. As a more detailed example, if the connection process is Microsoft Excel and the software certificate is verified, the second computer application may be configured to permit only Excel data to be transferred across the socket connection. Other data, such as Microsoft Word data or web browser data me be blocked from being sent across the socket connection, even though the socket connection itself is maintained. Again, this filtering of traffic over the socket connection can be based on the verification data associated with the connection process.

Figure 4:
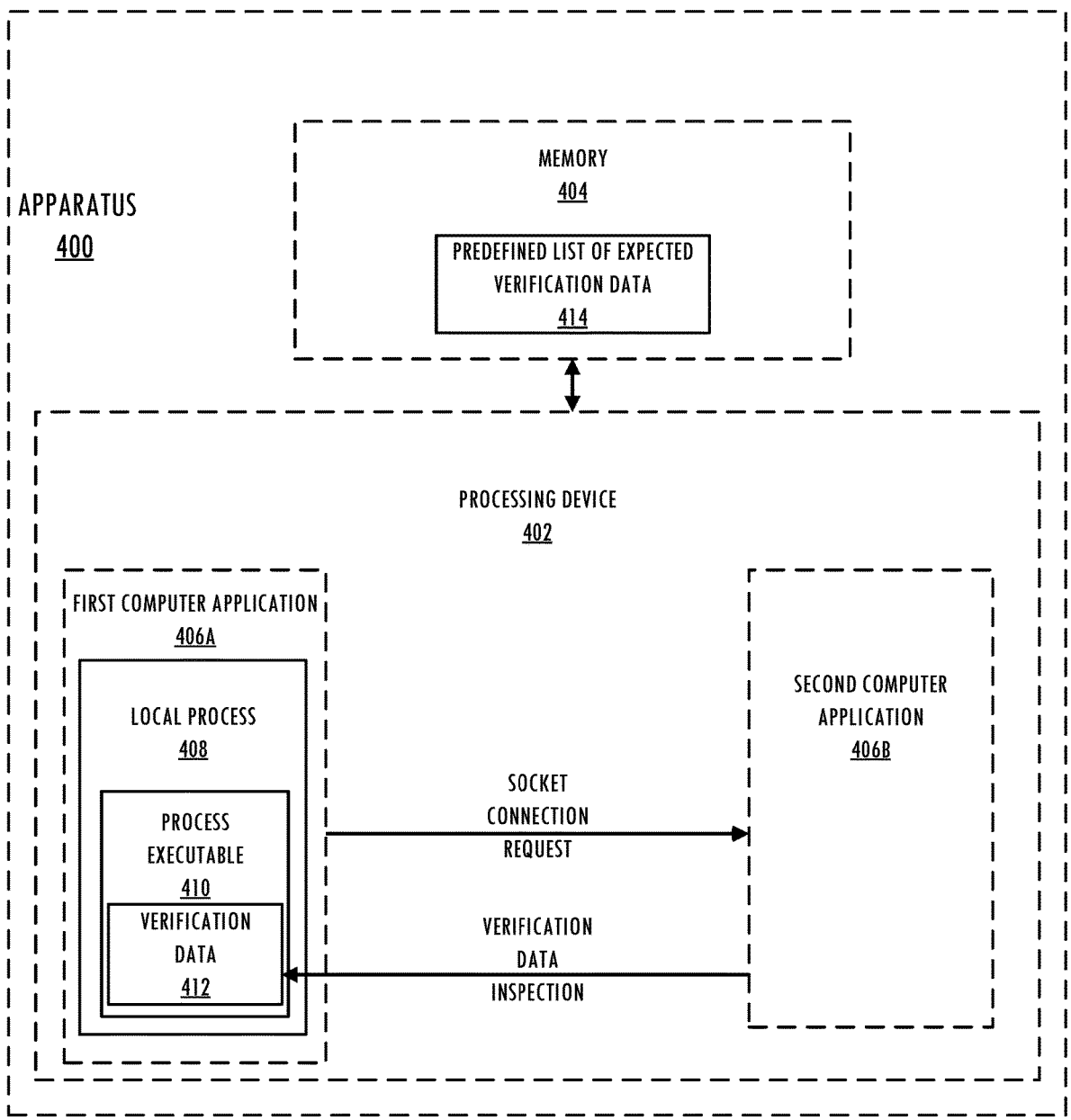
FIG. 4 is a block diagram of an apparatus in accordance with one or more embodiments of the disclosure.

FIG. 4 illustrates a block diagram of an apparatus 400 for performing incoming socket connection verification as described herein. In some embodiments, the apparatus comprises a processing device 402 operatively coupled to a memory 404. As illustrated, the processing device is executing a first computer application 406A and a second computer application 406B. The first computer application attempts to communicate with the second computer application and, in order to do so, generates a socket connection request to connect to the second computer application. The processing device receives the socket connection request within the second computer application and then is to determine a process executable 410 that initiated the socket connection request.

As described above, in order to determine the process executable 410 that initiated the socket connection request, the processing device 402 is further to determine the PID of the local process 408 or software process that initiated the socket connection request, wherein the process executable 410 operates within the local process or software process and is determined using the SDK. The local process or software process operates within the first computer application 406A. In some embodiments, the apparatus is to utilize, for example, an SDK such as Windows SDK, or any other suitable mechanism to query Windows for the full executable details for the particular process associated with the PID. In other words, the full file path to the process executable 410 is determined.

In some embodiments, the processing device 402 is to query Windows to verify the EXE which informs the processing device whether the EXE has been signed at all. If the EXE is not signed, the processing device will optionally reject the socket connection. If the EXE is signed, the processing device is to query Windows, such as through the Crypto APIs, or any other suitable source, to retrieve or extract verification data 412, including signing details, a certificate (e.g., software certificate), signature, or other indication that validates that the process executable is authentic, from the process executable 410. The processing device is then to inspect the verification data. As described above, the signing details or software certificates (of the verification data) verify what software developer developed the local process and verifies that the software is authentic and created by the software developer. In some embodiments, the memory 404 includes a predefined list of expected verification data 414 and the processing device is to determine whether verification data associated with the process executable (i.e., extracted from the process executable 410) corresponds to expected verification data of the process executable.

The predefined list of expected verification data can include a list of only desired applications permitted for creating a socket connection with the second computer application. For example, the user of the apparatus 400 may wish to only allow certain native applications to be able to communicate with other computer applications operating on the apparatus. As such, a user may define which application verification data is added to the predefined list. Alternatively, the predefined list of expected verification data can include a list of any suitable computer application or software application author and include the expected verification data for each software application in the list.

Using the example from above, the process executable may be "excel.exe", and the extracted verification data (e.g., software certificate) for the process executable may so indicate. The processing device is to compare the extracted verification data to the predefined list of expected verification data 414. In some embodiments, the expected verification data includes a predefined list of one or more known certificates, software certificates, known signatures or singing details, each associated with a verified process executable, and the processing device 402 is further to determine whether the extracted certificate or signature is on the predefined list of one or more known certificates or known signatures.

In response to the (extracted) verification data corresponding to the expected verification data (i.e., the extracted verification data is on the predefined list of expected verification data 414), the processing device is to permit a socket connection corresponding to the socket connection request. That is, the socket connection created based on the socket connection request sent from the first computer application 406A to the second computer application 406B is permitted to remain open, and data communication is permitted across the socket connection between the first computer application and the second computer application.

However, in response to the verification data (i.e., extracted verification data) not corresponding to the expected verification data (i.e., not being on the predefined list of expected verification data 414), the processing device 402 is to terminate the socket connection corresponding to the socket connection request. Data communication is therefore not permitted across the socket connection.

In some embodiments, the process executable may not have any verification data associated therewith. In such embodiments, the processing device 402 is to determine, using the techniques described above, whether the process executable includes any verification data associated therewith. In response to the process executable not having verification data, the processing device is to terminate the socket connection corresponding to the socket connection request and no communication is permitted across the socket connection. However, as described above, in response to the process executable having verification data, the processing device is to extract the verification data and compare the verification data to the expected verification data (i.e., the predefined list of expected verification data) to determine whether the verification data associated with the process executable corresponds to the expected verification data of the process executable. If the extracted verification data does correspond to the expected verification data on the predefined list 414, the socket connection is permitted to be maintained. If the extracted verification data does not correspond to the expected verification data on the predefined list, then the socket connection is terminated.

In some embodiments, the processing device 402 is further to extract the verification data of the process executable and store the verification data in the memory 404 and associate the stored verification data with the socket connection. As described above, in some embodiments, the processing device 402 is further to filter traffic communicated across the socket connection based on the verification data associated with the socket connection. For example, certain types of data may be permitted across the socket connection based on the software certificate or signature details of the process executable 410 that initiated the socket connection. Other types of data will be blocked.

The first computer application 406A can be a native application running on the apparatus 400 or any other suitable application. The second computer application 406B can be a proprietary or non-native application running on the apparatus or any other suitable application, including a native application.

Figure 5:
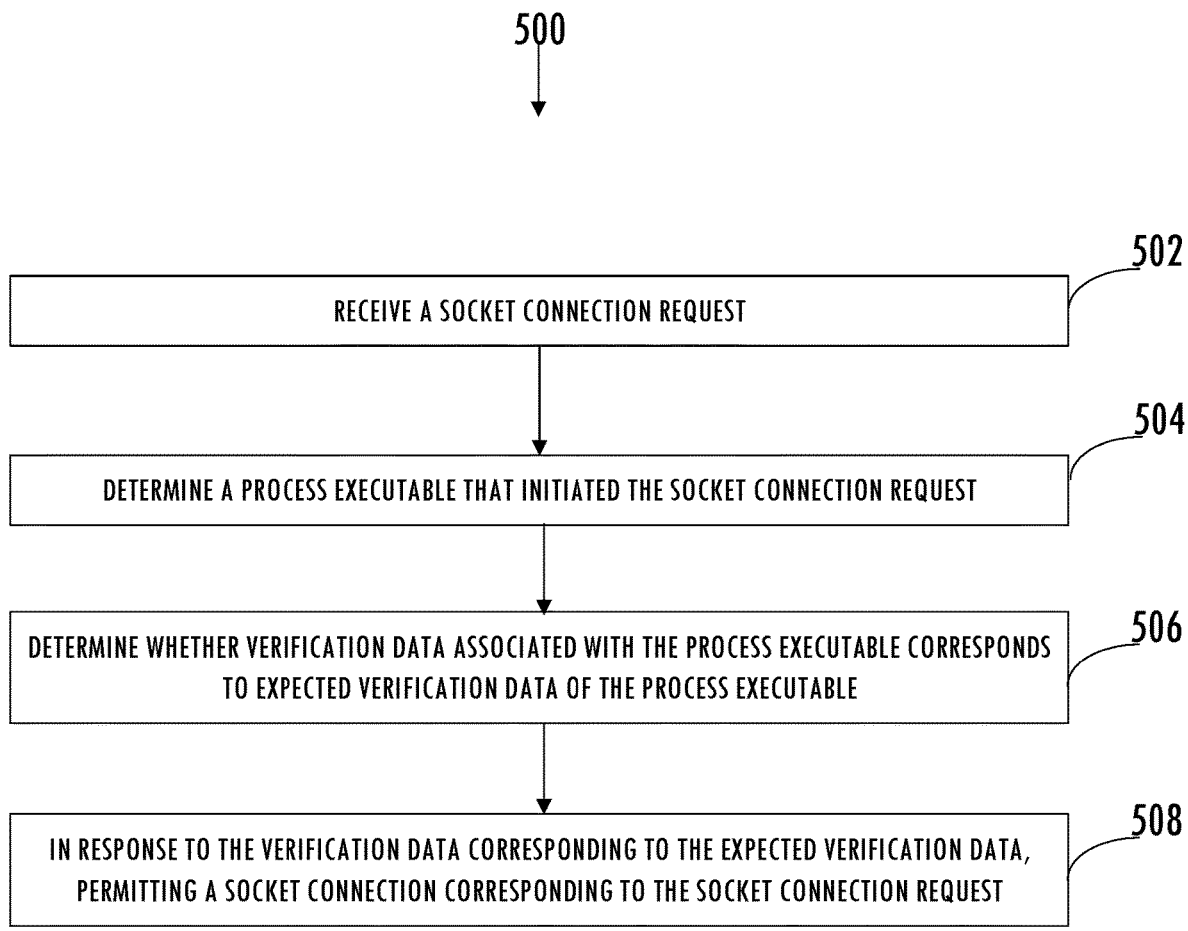
FIG. 5 is a flow diagram of a method in accordance with one or more embodiments of the disclosure.

FIG. 5 is a flow diagram of an example method 500 for securely copying and pasting content or data between computer applications. As shown in block 502, the method includes receiving a socket connection request. As shown in block 504, the method includes determining a process executable that initiated the socket connection request. As shown in block 506, the method includes determining whether verification data associated with the process executable corresponds to expected verification data of the process executable. As shown at block 508, the method further includes, in response to the verification data corresponding to the expected verification data, permitting a socket connection corresponding to the socket connection request.

Figure 6:
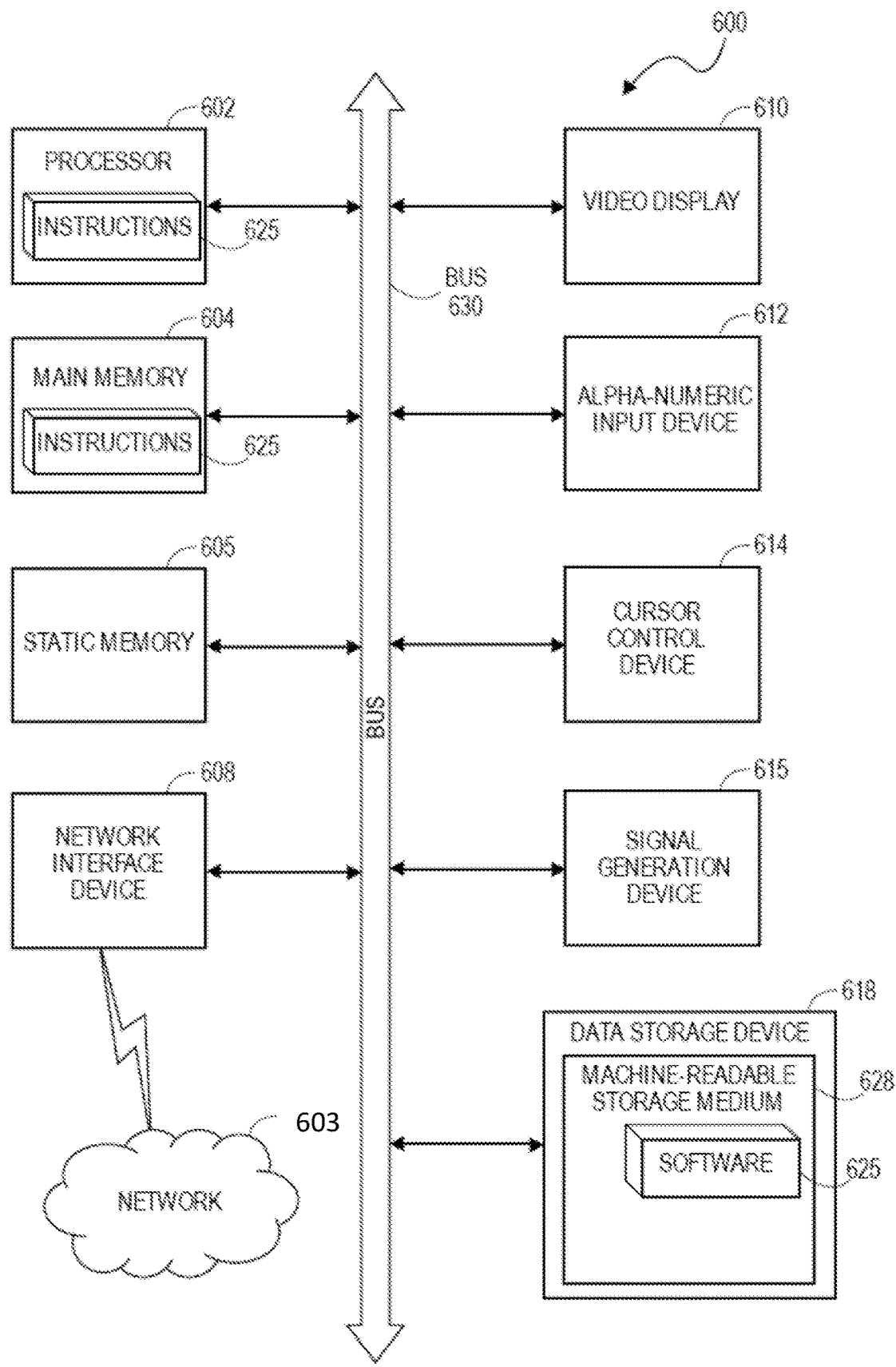
FIG. 6 is a block diagram of a computing device that may perform one or more of the operations described in accordance with one or more embodiments of the disclosure.

FIG. 6 is a block diagram of an example computing device 600 that may perform one or more of the operations described herein (such as the operations of the processing device 402 described in FIG. 4), in accordance with some embodiments. More particularly, computing device 600 may be integrated in or separate from any other computing device such as a server or other computing device to perform any of the described operations. Computing device 600 may be connected to other computing devices in a local area network (LAN), an intranet, an extranet, or the Internet. The computing device may operate in the capacity of a server machine in the client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 605 (e.g., flash memory and a data storage device 618), which may communicate with each other via a bus 630.

The processing device 602 may be provided by one or more general-purpose processing devices such as a microprocessor, central processing unit, or the like. In an illustrative example, processing device(s) 602 may comprise a complex instruction set computing (CISC) microprocessor, reduced instruction set computing (RISC) microprocessor, very long instruction word (VLIW) microprocessor, or a processing device implementing other instruction sets or processors implementing a combination of instruction sets. Processing device(s) 602 may also comprise one or more special-purpose processing devices such as an application specific integrated circuit (ASIC), a field programmable gate array (FPGA), a digital signal processor (DSP), network processor, or the like. The processing device(s) 602 may be configured to execute the operations described herein, in accordance with one or more aspects of the present disclosure, for performing the operations and steps discussed herein.

Computing device 600 may further include a network interface device 608 which may communicate with a network 603. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In one embodiment, video display unit 610, alphanumeric input device 612, and cursor control device 614 may be combined into a single component or device (e.g., an LCD touch screen).

Data storage device 618 may include a non-transitory computer-readable storage medium 628 on which may be stored one or more sets of instructions 625 that may include instructions for carrying out the operations described herein, in accordance with one or more aspects of the present disclosure. Instructions 625 may also reside, completely or at least partially, within main memory 604 or within processing device(s) 602 during execution thereof by computing device 600, main memory 604 and processing device(s) 602 also constituting computer-readable media. The instructions 625 may further be transmitted or received over a network 603 via network interface device 608.

While computer-readable storage medium 628 is shown in an illustrative example to be a single medium, the term "computer-readable storage medium" should be taken to include a single medium or multiple media (e.g., a centralized or distributed database or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving a socket connection request;
   utilizing a software development kit to determine a process executable that initiated the socket connection request, wherein the process executable operates within a software process;
   determining, by a processing device, whether verification data associated with the process executable corresponds to expected verification data of the process executable; and
   in response to the verification data corresponding to the expected verification data, permitting a socket connection corresponding to the socket connection request.

2. The method of claim 1, further comprising in response to the verification data not corresponding to the expected verification data, terminating the socket connection corresponding to the socket connection request.

3. The method of claim 1, wherein the verification data includes a certificate or signature that validates that the process executable is authentic.

4. The method of claim 3, wherein the expected verification data includes a predefined list of one or more known certificates or known signatures, each associated with a verified process executable, and wherein determining whether the verification data corresponds to the expected verification data includes determining whether the certificate or signature is on the predefined list of one or more known certificates or known signatures.

5. The method of claim 1, further comprising determining whether the process executable includes any verification data; and
   in response to the process executable not having verification data, terminating the socket connection corresponding to the socket connection request; and
   in response to the process executable having verification data, extracting the verification data and comparing the verification data to the expected verification data to determine whether the verification data associated with the process executable corresponds to the expected verification data of the process executable.

6. The method of claim 1, further comprising extracting the verification data of the process executable and storing the verification data in memory and associating the stored verification data with the socket connection.

7. The method of claim 1, further comprising filtering traffic communicated across the socket connection based on the verification data.

8. An apparatus comprising:
   a memory; and
   a processing device operatively coupled to the memory to:
   receive a socket connection request;
   utilize a software development kit to determine a process executable that initiated the socket connection request, wherein the process executable operates within a software process;
   determine whether verification data associated with the process executable corresponds to expected verification data of the process executable; and
   in response to the verification data corresponding to the expected verification data, permit a socket connection corresponding to the socket connection request.

9. The apparatus of claim 8, wherein the processing device is further to, in response to the verification data not corresponding to the expected verification data, terminate the socket connection corresponding to the socket connection request.

10. The apparatus of claim 8, wherein the verification data includes a certificate or signature that validates that the process executable is authentic.

11. The apparatus of claim 10, wherein the expected verification data includes a predefined list of one or more known certificates or known signatures, each associated with a verified process executable, and wherein the processing device is further to determine whether the certificate or signature is on the predefined list of one or more known certificates or known signatures.

12. The apparatus of claim 8, wherein the processing device is further to:
   determine whether the process executable includes any verification data; and
      in response to the process executable not having verification data, terminate the socket connection corresponding to the socket connection request; and
      in response to the process executable having verification data, extract the verification data and compare the verification data to the expected verification data to determine whether the verification data associated with the process executable corresponds to the expected verification data of the process executable.

13. The apparatus of claim 8, wherein the processing device is further to extract the verification data of the process executable and store the verification data in memory and associate the stored verification data with the socket connection.

14. The apparatus of claim 8, wherein the processing device is further to filter traffic communicated across the socket connection based on the verification data.

15. A non-transitory computer readable storage medium to store instructions executable by a processing device, cause the processing device to:
   receive a socket connection request;
   utilize a software development kit to determine a process executable that initiated the socket connection request, wherein the process executable operates within a software process;
   determine, by the processing device, whether verification data associated with the process executable corresponds to expected verification data of the process executable; and
   in response to the verification data corresponding to the expected verification data, permit a socket connection corresponding to the socket connection request.

16. The non-transitory computer readable storage medium of claim 15, wherein the processing device is further to, in response to the verification data not corresponding to the expected verification data, terminate the socket connection corresponding to the socket connection request.

17. The non-transitory computer readable storage medium of claim 15, wherein the verification data includes a certificate or signature that validates that the process executable is authentic.

* * * * *